(12) United States Patent
Yamaguchi

(10) Patent No.: US 6,757,173 B2
(45) Date of Patent: Jun. 29, 2004

(54) CARD CONNECTOR ASSEMBLY

(75) Inventor: Katsumi Yamaguchi, Saitama (JP)

(73) Assignee: Tyco Electronics AMP k.K., Kanagawa (JP)

( * ) Notice: Subject to any disclaimer, the term of this patent is extended or adjusted under 35 U.S.C. 154(b) by 0 days.

(21) Appl. No.: 10/205,879

(22) Filed: Jul. 26, 2002

(65) Prior Publication Data

US 2003/0021093 A1 Jan. 30, 2003

(30) Foreign Application Priority Data

Jul. 27, 2001 (JP) ........................................ 2001-227628

(51) Int. Cl.$^7$ .......................... H05K 05/06; H05K 1/00; H01R 12/00
(52) U.S. Cl. ..................... 361/752; 439/64; 439/136; 439/142
(58) Field of Search ................................ 361/737, 740, 361/741, 747, 752, 756, 759, 801, 802, 683–686; 439/64, 136, 138, 142, 148, 159, 541.5, 540.1

(56) References Cited

U.S. PATENT DOCUMENTS

| 6,120,322 A | * | 9/2000 | Ho et al. ................. 439/541.5 |
| 6,269,005 B1 | * | 7/2001 | Tung et al. ................. 361/737 |
| 6,377,451 B1 | * | 4/2002 | Furuya ....................... 361/686 |

FOREIGN PATENT DOCUMENTS

JP          07282204 A    10/1995    .......... G06K/13/06

* cited by examiner

Primary Examiner—Phuong T. Vu
(74) Attorney, Agent, or Firm—Barley Snyder

(57) ABSTRACT

A card connector assembly having a slot for inserting a card that has raised portions and a connector that receives the card that is inserted into the slot. An anti-dust shutter that pivots into an interior of the slot when the card is inserted. The anti-dust shutter having an interference avoiding means in the form of a cut-out or a projection that enables the card to be withdrawn from the slot without interference from the raised portions. The card connector assembly making it possible to withdraw cards having raised portions, such as PC cards that handle card busses, from the card connector assembly without interference with the anti-dust shutter.

13 Claims, 13 Drawing Sheets

F I G. 10
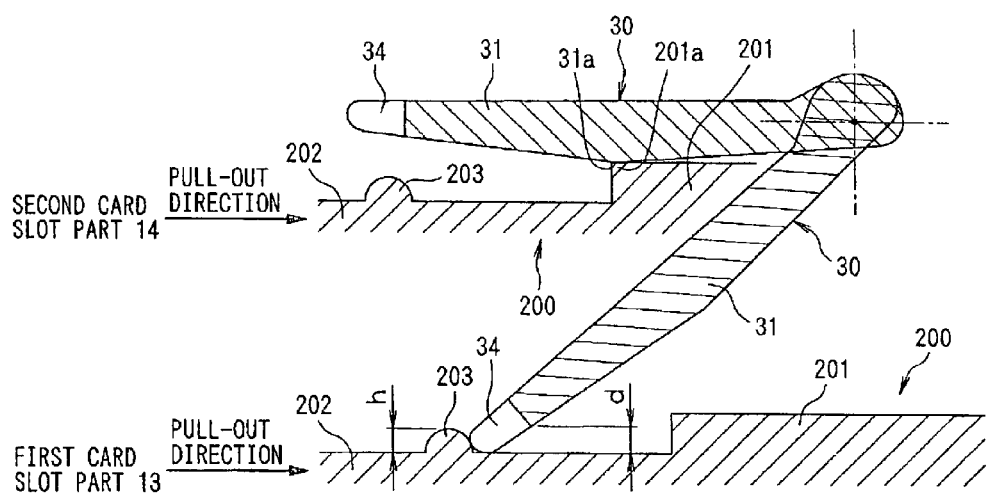

CARD CONNECTOR ASSEMBLY

FIELD OF THE INVENTION

The invention relates to a card connector assembly having a slot into which cards such as PC cards or the like are inserted. More specifically, the invention relates to a card connector assembly having a slot and an anti-dust shutter that prevents foreign matter from entering the connector.

DESCRIPTION OF THE PRIOR ART

There has been a rapid increase in the use of PC cards in electronic equipment such as personal computers as a result of the establishment of standards for PC cards such as PCMCIA. PC cards according to PCMCIA standards consist of three types of cards classified according to use, i.e., type I cards are used as semiconductor memory cards, type II cards are used as modem cards, and type III cards are used as hard disk cards. The types of PC cards also have different thickness. Type I and type II cards have almost the same thickness, and type III cards have a thickness that is almost twice that of the type II cards.

Especially in the case of portable personal computers, card connector assemblies are generally equipped with a slot into which PC cards are inserted and a connector that receives the PC cards. Although all three types of cards can be used in common connector assemblies, the method of insertion varies according to the card thickness. Because type I and type II cards have almost the same thickness, these cards can be used in common and each card takes up a single slot. Because type III cards have a thickness that is almost twice that of type II cards, an accommodating space equal to two slots for type II cards is required. Accordingly, so-called double slot type card connector assemblies in which two slots for PCMCIA PC cards are overlapped have been commercialized.

In a double slot type card connector assembly, dirt may enter the interior of the slot or connector and adhere to the connector. Accordingly, an anti-dust shutter is disposed at the card insertion end of the slot and is used to prevent the adhesion of dirt. For example, the mechanism shown in FIG. 15 is known as a conventional anti-dust shutter mechanism for a double slot type card connector assembly (see Japanese Patent Application Laid-Open No. H7-282204). FIG. 15 shows an anti-dust shutter mechanism, a first card slot 101b into which a first card 106 is inserted, and a second card slot 101c into which a second card 107 is inserted. The slots 101b, 101c are disposed in two tiers (above and below) inside an electronic device main body 101. The first and second card slots 101b, 101c open to the outside via a single opening part 101a. A first connector 108 receives the first card 106, and a second connector 109 receives the second card 107. The first and second connectors 108, 109 are disposed in a stacked configuration on the opposite side of the electronic device main body 101 from the opening part 101a. The first card slot 101b and second card slot 101c communicate with each other, so that a third card (not shown) with a thickness that is twice that of the first card 106 or second card 107 can also be inserted. The card connector assembly is arranged so that when the third card is inserted into the first and second card slots 101b, 101c, the third card is connected to the first connector 108.

A first shutter main body 102 is rotatably shaft-supported by a pivoting shaft 102a in the vicinity of the opening part 101a (i.e., in the vicinity of the card insertion end) of the first card slot 101b. A second shutter main body 103 is rotatably shaft-supported by a pivoting shaft 103a in the vicinity of the opening part 101a of the second card slot 101c. The first and second shutter main bodies 102, 103 are disposed like folding doors. When no cards 106, 107 are inserted, the shutter main bodies 102, 103 are spring-driven in the direction that closes the opening part 101a. When the first card 106 and/or second card 107 are inserted, the shutter main bodies 102, 103 are pushed by the cards 106, 107, and pivot so that the shutter main bodies 102, 103 are retracted into the interiors of the first and second card slots 101b, 101c.

As the first and/or second cards 106, 107 are inserted into the respective first and second card slots 101b, 101c, the first and second shutter main bodies 102, 103 are pushed by the cards 106, 107. The first shutter main body 102 pivots in the direction A, and the second shutter main body 103 pivots in the direction B, as shown in FIG. 15(B). The first shutter main body 102 and second shutter main body 103 retract into the interiors of the first card slot 101b and second card slot 101c. When the first card 106 and second card 107 are pushed in even further, the first card 106 and second card 107 are respectively received in and connected to the first connector 108 and second connector 109. When the first card 106 and second card 107 are respectively connected to the first connector 108 and second connector 109 signals from the respective cards can be transmitted to circuit boards connected to the first connector 108 and second connector 109, or signals from the circuit boards can be conversely transmitted to the respective cards.

Additional PCMCIA standards have been added for cards which handle card busses requiring a ground to be formed on one of the two surfaces of the PC card. FIG. 16 shows a conventional PC card 200 that handles a card bus. The PC card 200 comprises a metal plate part 201 that covers a surface of an insulating housing (not shown), and a metal ground plate part 202 that is disposed on a tip end portion of one surface of the insulating housing. The ground plate part 202 is insulated from the metal plate part 201, and a plurality of protruding contact projections 203 are formed at a specified pitch in the direction of width on the surface of the ground plate part 202. For example, when the PC card 200 is received in the card connector assembly disclosed in Japanese Patent Application Laid-Open No. H8-241764, the contact projections 203 have the function of reducing noise by making contact with ground parts disposed in the card connector assembly.

When the PC card 200 for handling a card bus shown in FIG. 16 is used in the anti-dust shutter mechanism shown in FIG. 15, the contact projections 203 formed on the ground plate part 202 interfere with the free end of the spring-driven first shutter main body 102 or second shutter main body 103 when the PC card 200 is withdrawn from the first card slot 101b or second card slot 101c, as shown in FIG. 17 (FIG. 17 shows only a case in which the PC card 200 is pulled out of the second card slot 101c). Because the contact projections 203 interfere with the free ends of the first and second shutter main bodies 102, 103, the first and second shutter main bodies 102, 103 can be damaged when the PC card 200 is withdrawn.

It is, therefore, desirable to develop a card connector assembly which prevents projections on the surfaces of cards, such as PC cards that handle card busses or the like, from interfering with anti-dust shutters provided on the card connector assembly when the cards are withdrawn from the card connector assembly.

SUMMARY OF THE INVENTION

It is an object of the present invention to provide a card connector assembly which makes it possible to prevent raised portions on the surfaces of cards, such as PC cards that handle card busses, from interfering with an anti-dust shutter when the cards are withdrawn from the card connector assembly. This and other objects are achieved by a card connector assembly having a slot for inserting a card that has raised portions and a connector that receives the card that is inserted into the slot. An anti-dust shutter that pivots into an interior of the slot when the card is inserted. The anti dust-shutter having an interference avoiding means in the form of a cut-out or a projection that enables the card to be withdrawn from the slot without interference from the raised portions.

BRIEF DESCRIPTION OF THE DRAWINGS

FIG. 9 shows the anti-dust cover of the card connector assembly shown in FIG. 1.

FIG. 10 is an explanatory diagram that illustrates the relationship between the projections formed on the surface of the PC card and the free end of the anti-dust shutter when the PC card is withdrawn;

FIG. 13 shows the anti-dust shutter of the card connector assembly shown in FIG. 11.

FIG. 15(A) is a partial perspective view, and FIG. 15(B) is a partial sectional view;

FIG. 16 shows a PC card that handles a card bus of the prior art.

DETAILED DESCRIPTION OF THE PREFERRED EMBODIMENT

Figure 1:
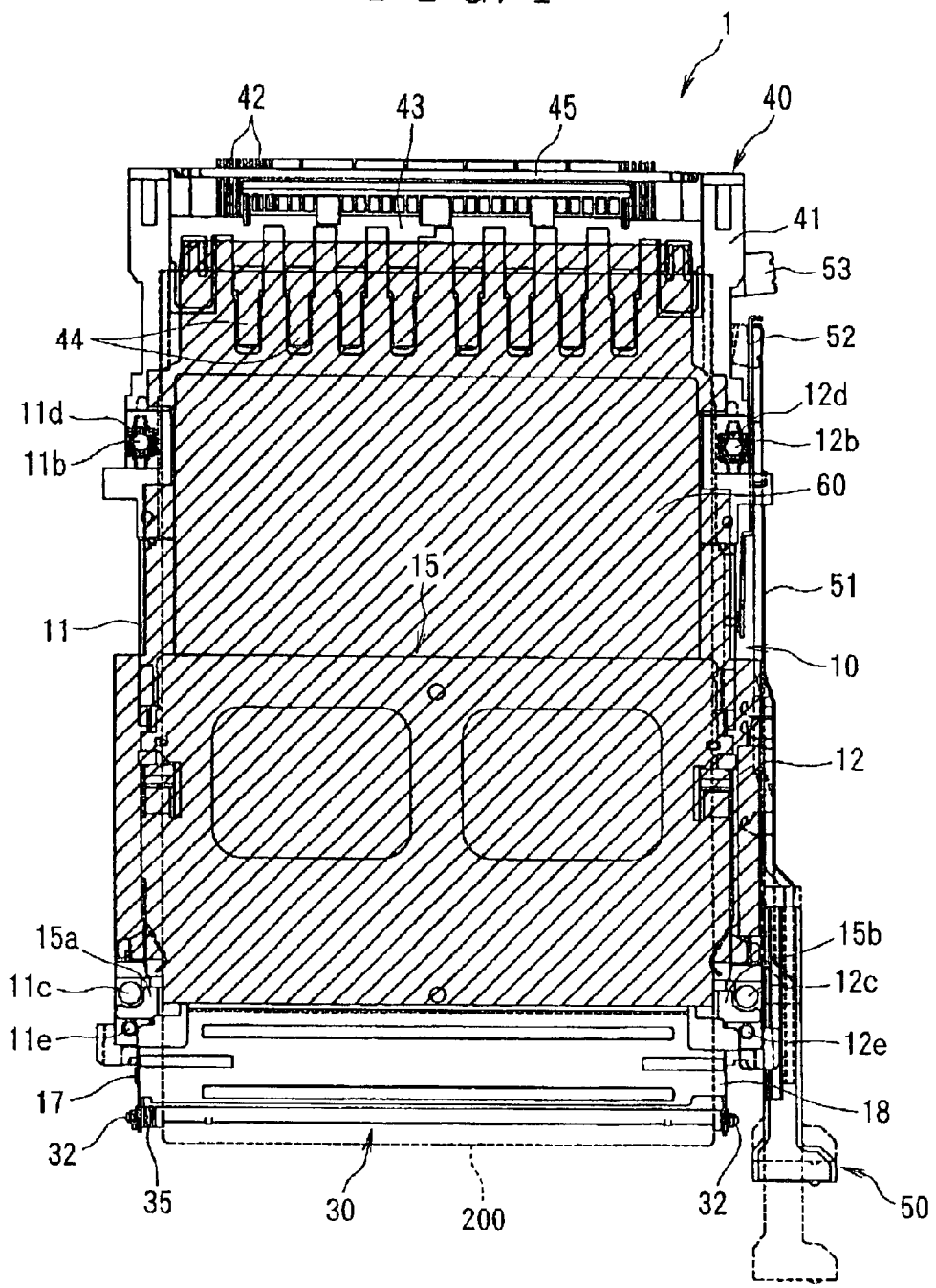
FIG. 1 is a plan view of a first embodiment of the card connector assembly of the present invention.

FIGS. 1 through 10 show a first embodiment of a double slot type card connector assembly 1 having a slot 10 and a connector 40. Shown in FIG. 1, the connector 40 comprises an insulating housing 41 that receives a first, second, or third card (not shown) that is inserted into the slot 10. A plurality of contacts 42 are attached to the insulating housing 41 and are connected to the received first, second, or third card (not shown). A pair of guiding arm parts 11, 12 extend from both ends of the connector 40 with respect to the direction of length. Respective metal ground plates 43 are disposed on the upper wall of the insulating housing 41 and on a partition plate 46, shown in FIG. 6. Elastic tongue parts 44 are disposed on the respective ground plates 43. The ground plates 43 and contacts 42 are connected to a relay board 45. The relay board 45 is connected to a circuit board A, shown in FIGS. 2 through 4, via a connector (not shown).

Figure 6:
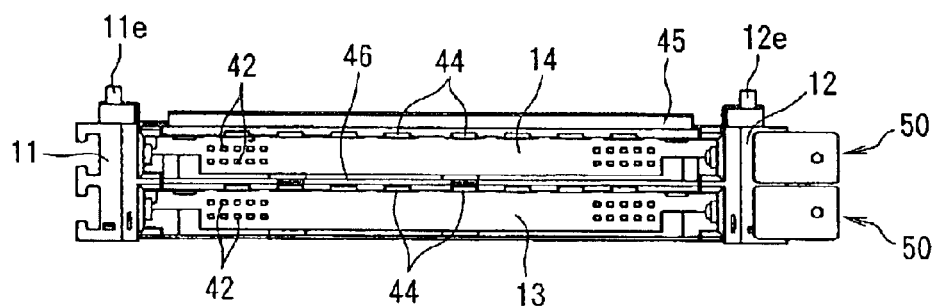
FIG. 6 is a front view showing a state in which the anti-dust shutter has been removed from the card connector assembly shown in FIG. 1.

Shown in FIG. 6, the slot 10 is constructed from a first card slot portion 13 and a second card slot portion 14 formed in two tiers (upper and lower) between the pair of guiding arm parts 11, 12. The partition plate 46 is disposed in substantially the central portion with respect to the vertical direction of the insulating housing 41 so that a top side of the partition plate 46 faces the second card slot portion 14 and a bottom side of the partition plate 46 faces the first card slot portion 13.

Figure 5:
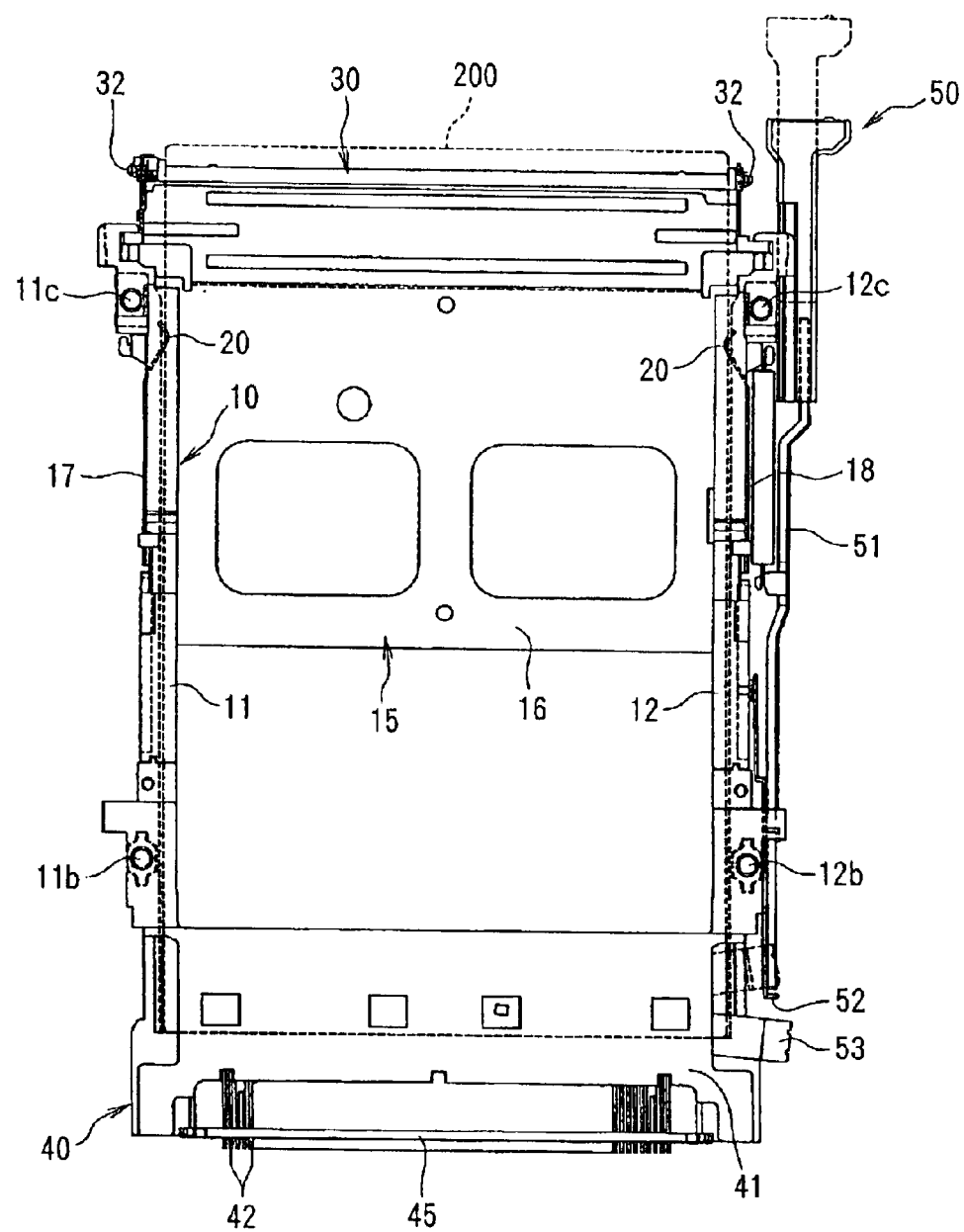
FIG. 5 is a bottom view of the card connector assembly shown in FIG. 1.
Figure 7:
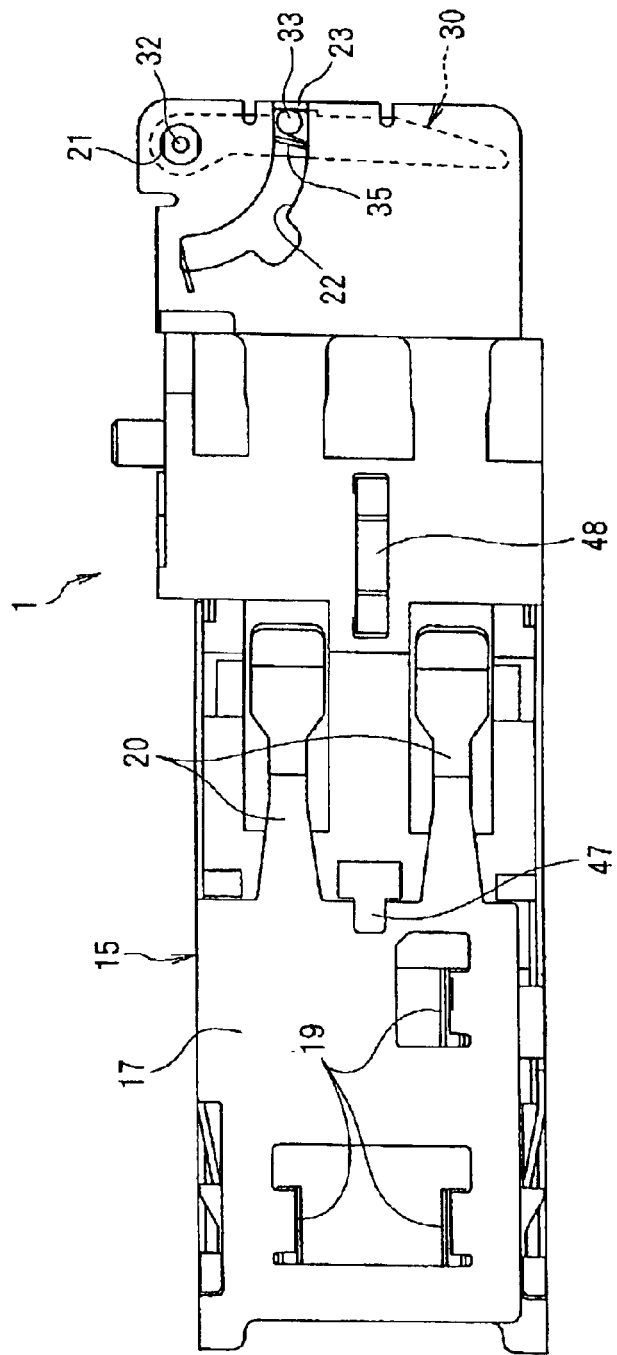
FIG. 7 is a left-side view of a metal frame portion at a card insertion end of the card connector assembly shown in FIG. 1.

Shown in FIG. 5, a metal frame 15 covers approximately half of the space formed between the guiding arm parts 11, 12 and is disposed at a card insertion end of the slot 10. The metal frame 15 comprises a flat-plate part 16 that covers approximately half of the space formed between the pair of arm parts 11, 12, and a pair of side plate parts 17, 18 that extend from both end portions with respect to the direction of length of the flat-plate part 16. The side plate parts 17, 18 are attached to the outer wall surfaces of the respective guiding arm parts 11, 12. As best shown in FIG. 7, the respective side plate parts 17, 18 are anchored to the outer wall surfaces of the respective arm parts 11, 12 by anchoring parts 19 and a projection 47 on the guiding arm parts 11, 12. Elastic tongue parts 20 are disposed on the respective side parts 17, 18.

Shown in FIG. 7, an anti-dust shutter 30 which is used to prevent dirt from entering the interiors of the slot 10 and connector 40 is installed at the card insertion end of the metal frame 15. The anti-dust shutter 30 is formed by molding an insulating resin. Shown in FIGS. 8 and 9, the anti-dust shutter 30 has a flat-plate part 31 that substantially covers the space between the pair of side plate parts 17, 18. An apex 31a is formed on a bottom surface of the flat-plate part 31. A pair of pivoting shafts 32 is disposed on the upper ends of both end surfaces of the flat-plate part 31 with respect to the direction of length. As best shown in FIG. 7, the respective pivoting shafts 32 are shaft-supported in holes 21 formed in the upper portions of the card insertion ends of the respective side plate parts 17, 18 (only the hole 21 formed in the side plate part 17 is shown in FIG. 7). The pivoting shafts 32 are attached by means such as plastic rings, metal G-rings or C-rings so that the pivoting shafts 32 are free to pivot. Shown in FIGS. 1 and 2, on the side of the side plate part 17, the pivoting shaft 32 has a torsion coil spring 35 about the circumference of the pivoting shaft 32 that constantly drives the flat-plate part 31 in the closing direction (i.e., in the direction which causes the flat-plate part 31 to cover the space between the pair of side plate parts 17, 18).

Shown in FIG. 7, a stopper 33 protrudes from one end portion with respect to the direction of length of the flat-plate part 31 on the side of the side plate part 17. When the anti-dust shutter 30 pivots, the stopper 33 is guided by a guide hole 22. The guide hole 22 is formed roughly in the shape of a quarter circular arc in the side plate part 17 about the hole 21. The stopper 33 contacts a stopper wall 23 disposed at the card insertion end of the guide hole 22 to regulate the pivoting of the anti-dust shutter 30 in the closing direction.

Figure 8:
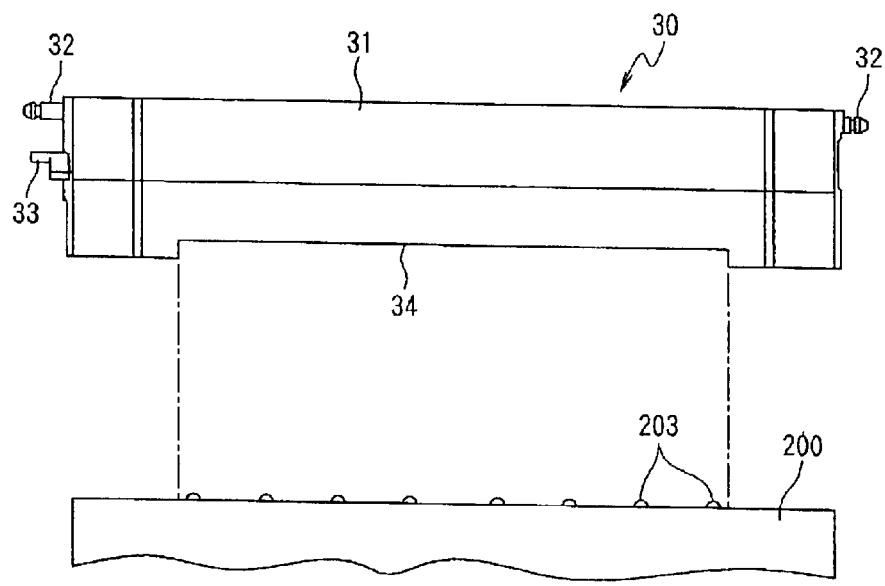
FIG. 8 is a front view showing the positional relationship between the anti-dust shutter used in the card connector assembly shown in FIG. 1 and projections formed on a surface of a PC card.
Figure 9A:
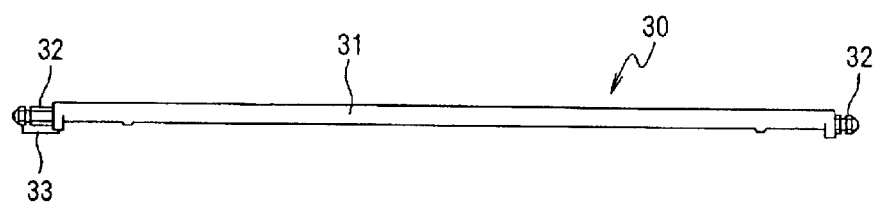
FIG. 9(A) is a plan view of the anti-dust shutter.
Figure 9B:
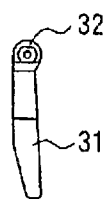
FIG. 9(B) is a right-side view of the anti-dust shutter.

Shown in FIG. 8, a cut-out 34 is formed in the free end of the anti-dust shutter 30 in a position facing the projections 203 formed on the surfaces of the ground plates 202 of standardized PC cards 200 (shown as first and second cards in this illustration). Since the height h by which the projections 203 of the PC card 200 protrude from the ground plate 202 is 0.5 mm, it is desirable that the depth d extending from the point of engagement of the free end of the anti-dust shutter 30 with the ground plate 202 (when the free end is engaged with the surface of the ground plate 202) to the point of intersection of the cut-out 34 with the undersurface of the flat-plate part 31 be greater than 0.5 mm.

Figure 4:
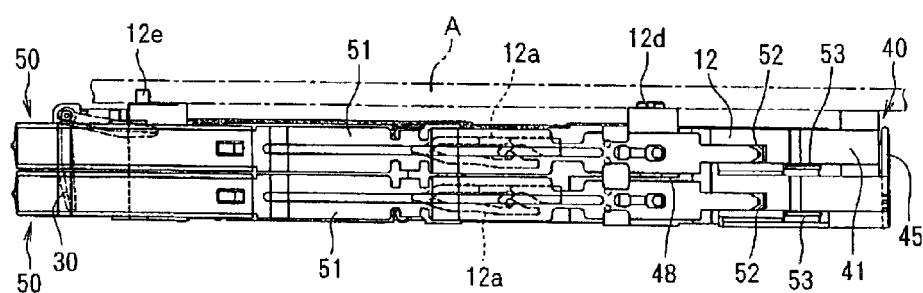
FIG. 4 is a right-side view of the card connector assembly shown in FIG. 1.

As shown in FIG. 5, ejection mechanisms 50 formed in two tiers (upper and lower) are used to eject the first, second, or third card. The ejection mechanisms 50 are disposed on the outer wall surface of the guiding arm part 12 that extends from the connector 40. Each ejection mechanism 50 uses a so-called push-push mechanism and comprises a metal lever 51, a push bar 52, and an ejection bar 53. The push bar 52 is attached to the lever 51 so that the push bar 52 can pivot. One end of the push bar 52 is engaged in a heart-shaped cam groove 12a formed in the outer wall surface of the guiding arm part 12, as best shown in FIG. 4. The ejection bar 53 is disposed along the direction of length of the insulating housing 41. The ejection bar 53 can pivot so that when one end of the ejection bar 53 is pushed by the push bar 52, the cards can be ejected.

Shown in FIGS. 1 and 5, screw through-holes 11b, 11c, 12b, 12c are formed in both end portions of the guiding arm parts 11, 12 with respect to the card insertion direction. Positioning posts 11e, 12e, used for positioning when the card connector assembly 1 is attached to the circuit board A, are caused to protrude in the vicinity of the screw through-holes 11c, 12c at the card insertion ends of the guiding arm parts 11, 12. Positioning projection parts 11d, 12d are caused to protrude around the screw through-holes 11b, 12b located at the inside ends of the guiding arm parts 11, 12 with respect to the card insertion direction.

Figure 2:
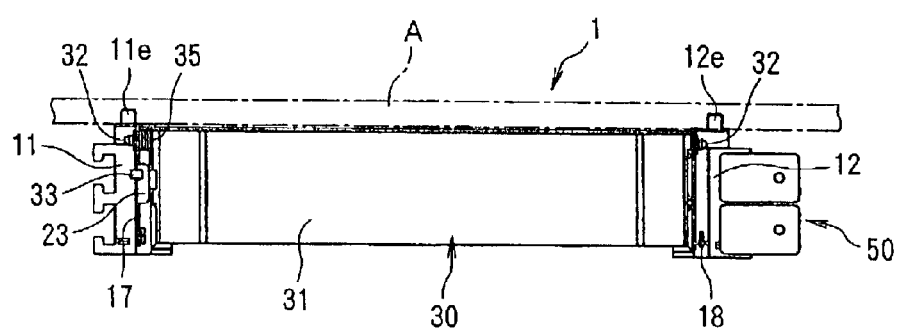
FIG. 2 is a front view of the card connector assembly shown in FIG. 1.
Figure 3:
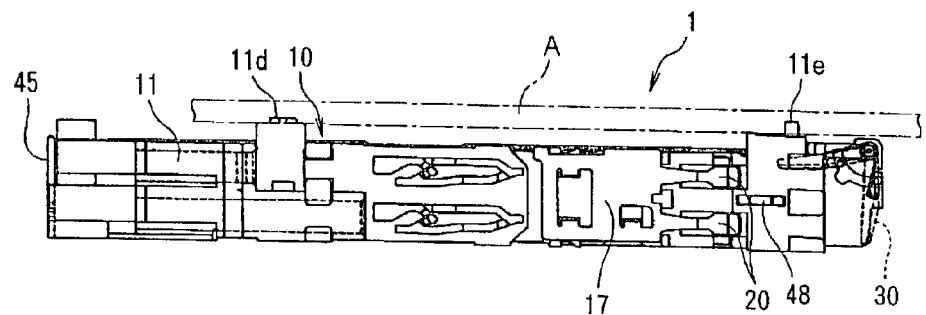
FIG. 3 is a left-side view of the card connector assembly shown in FIG. 1.

The card connector assembly 1 constructed as described above is attached to the underside of the circuit board A as shown in FIGS. 2 through 4 by engaging the relay board 45 with a connector (not shown) disposed on the undersurface of the circuit board A. Attachment screws are passed through the screw through-holes 11b, 11c, 12b, 12c from above the circuit board A and are screwed into nuts 48. When the card connector assembly 1 is attached to the circuit board A, the contacts 42 are electrically connected to the circuit board A via the relay board 42 and connector (not shown). The ground plate 43 is grounded to the circuit board A via the relay board 42 and connector (not shown). The frame 15 is grounded to the circuit board A via the tongue parts 15a, 15b.

Before the card connector assembly 1 is attached to the undersurface of the circuit board A, an insulating sheet 60 (indicated by hatching in FIG. 1) which covers the slot 10 (including a portion of the frame 15) and the ground plate 43 is bonded to the card connector assembly 1. The sheet 60 prevents short-circuiting between the electronic parts mounted on the undersurface of the circuit board A and the frame 15 and the ground plate 43. The sheet 60 also functions to protect the aforementioned electronic parts.

Figure 16A:
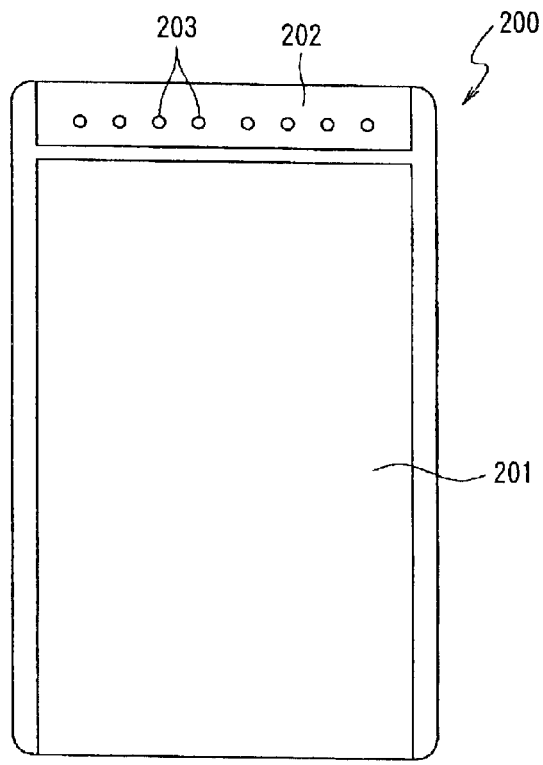
FIG. 16(A) is a plan view.
Figure 16B:
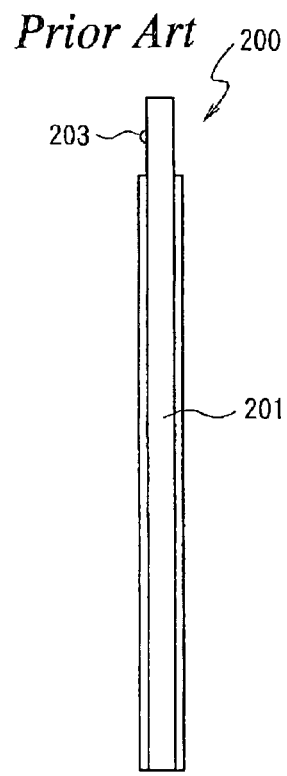
FIG. 16(B) is a right-side view.
Figure 17:
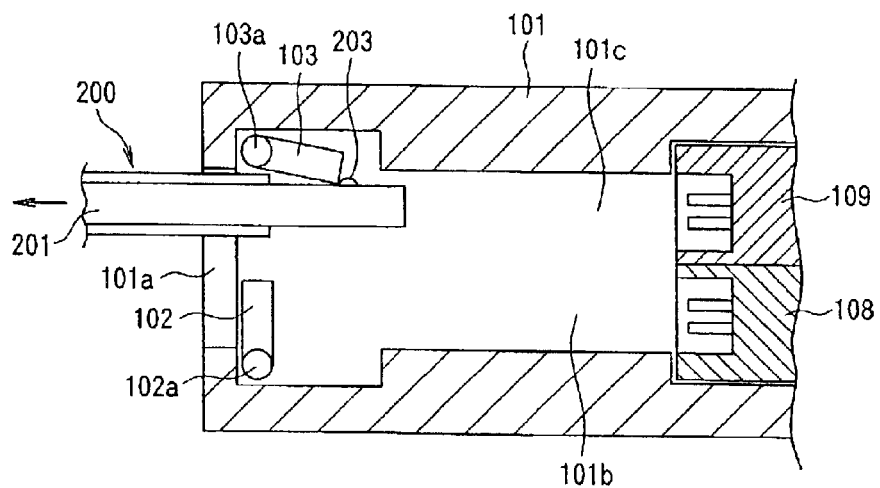
FIG. 17 is a sectional view illustrating the problems that occur in the prior art when the PC card 200 for handling a card bus shown in FIG. 16 is used in the anti-dust shutter mechanism shown in FIG. 15.

The operation of the first embodiment of the card connector assembly 1 will now be described in greater detail with reference to FIGS. 7 and 10. A first card for handling a card bus of type I or type II, such as the PC card 200 shown in FIG. 16, is inserted into the first card slot portion 13. A second card for handling a card bus of type I or type II, such as the PC card 200 shown in FIG. 16, is inserted into the second card slot portion 14. The first card slot portion 13 and the second card slot portion 14 communicate with each other such that a third card of type III with a thickness twice that of the first card or second card can also be inserted. The PC card 200 constituting the first card that is inserted into the first card slot portion 13 is received on the upper side of the partition plate 46 of the insulating housing 41, and is connected to a plurality of contacts 42 disposed on the upper side of the partition plate 46. The PC card 200 constituting the second card that is inserted into the second card slot portion 14 is received on the underside of the partition plate 46 of the insulating housing 41, and is connected to a plurality of contacts 42 disposed on the underside of the partition plate 46. If the third card having a thickness twice that of the first card or second card is inserted into the slot 10 a tip end of the third card is connected to a plurality of contacts 42 disposed on the underside of the partition plate 46.

As shown in FIG. 7, when the PC card 200 constituting the first card and the PC card 200 constituting the second card are inserted into the slot 10 in a state in which the anti-dust shutter 30 is closed, the anti-dust shutter 30 is pushed by the inserted PC cards 200, so that the anti-dust shutter 30 pivots from the state in which the stopper 33 is in contact with the stopper wall 23, and retracts into the interior of the slot 10. As the inserted PC cards 200 are pushed in further, the PC cards 200 are received in and connected to the connector 40, so that the PC cards 200 are connected to the circuit board A. At this time, the projections 203 formed on the ground plates 202 of the inserted PC cards 200 contact the elastic tongue parts 44 of the ground plate 43, so that the PC cards 200 are grounded. The side surfaces of the metal plate parts 201 of the PC cards 200 contact the elastic tongue parts 20 of the frame 15, so that the PC cards 200 are also grounded.

When the PC card 200 constituting the first card is withdrawn from the first card slot portion 13 of the slot 10, the free end of the anti-dust shutter 30 slides over the surface of the metal plate part 201 of the PC card 200, and further slides over the surface of the ground plate 202 of the PC card 200, as shown in FIG. 10. When the PC card 200 is completely withdrawn, the anti-dust shutter 30 pivots to the outside of the first card slot portion 13 until the stopper 33 contacts the stopper wall 23. As a result, the anti-dust shutter 30 closes and substantially covers the space between the pair of side plate parts 17, 18, so that the entry of dirt into the interiors of the slot 10 and connector 40 is prevented. Since a cut-out 34, which makes it possible to avoid interference between the projections 203 formed on the surface of the ground plate 202 and the anti-dust shutter 30, is formed in the free end of the anti-dust shutter 30, the projections 203 do not contact the anti-dust shutter 30 when the PC card 200 is withdrawn. Accordingly, damage to the anti-dust shutter 30 caused by contact of the projections 203 with the anti-dust shutter 30 can be avoided.

Furthermore, when the PC card 200 constituting the second card is to be pulled out of the second card slot portion 14 of the slot 10, the apex 31a formed on the undersurface of the flat-plate part 31 of the anti-dust shutter 30 slides over the surface of the metal plate part 201 which rises higher than the projections 203 from the ground plate 202 in the PC card 200 and the corner part 201a of the metal plate part 201 moves while contacting the undersurface of the flat-plate part 31 of the anti-dust shutter 30. As a result, the projections 203 do not contact the anti-dust shutter 30. When the withdrawal of the PC card 200 is completed, the anti-dust shutter 30 pivots to the outside of the second card slot portion 14 until the stopper 33 contacts the stopper wall 23. As a result, the anti-dust shutter 30 closes and substantially covers the space between the pair of side plate parts 17, 18, so that the entry of dirt into the slot 10 and connector 40 is prevented.

A second embodiment of the card connector assembly 1 will be described with reference to FIGS. 11 through 14. The basic construction of the second embodiment of the card connector assembly 1 shown in FIGS. 11 through 14 is similar to that of the first embodiment of the card connector assembly 1 shown in FIGS. 1 through 10 except the construction and shape of the anti-dust shutter 30 differs. In FIGS. 11 through 14, constituent parts that are the same as constituent parts in FIGS. 7 through 10 are labeled with the same symbols as those used in FIGS. 7 through 10.

As shown in FIGS. 11 through 14, the anti-dust shutter 30 in the second embodiment differs from the anti-dust shutter 30 shown in FIGS. 7 through 10 in that the anti-dust shutter 30 is provided with a pair of engaging projections 36. The engaging projections 36 extend from the free end of the anti-dust shutter 30 in positions that do not face the projections 203 formed on the surfaces of the ground plates 202 of the PC cards 200 that constitute the first card and second card. Since the height h to which the projections 203 on the standardized PC card 200 protrude from the surface of the ground plate 202 is 0.5 mm, it is desirable that the minimum height H from the point of engagement of the engaging projections 36 with the ground plate 202 (when the engaging projections 36 engage with the surface of the ground plate 202) to the attachment roots of the engaging projections 36 be greater than 0.5 mm.

Figure 11:
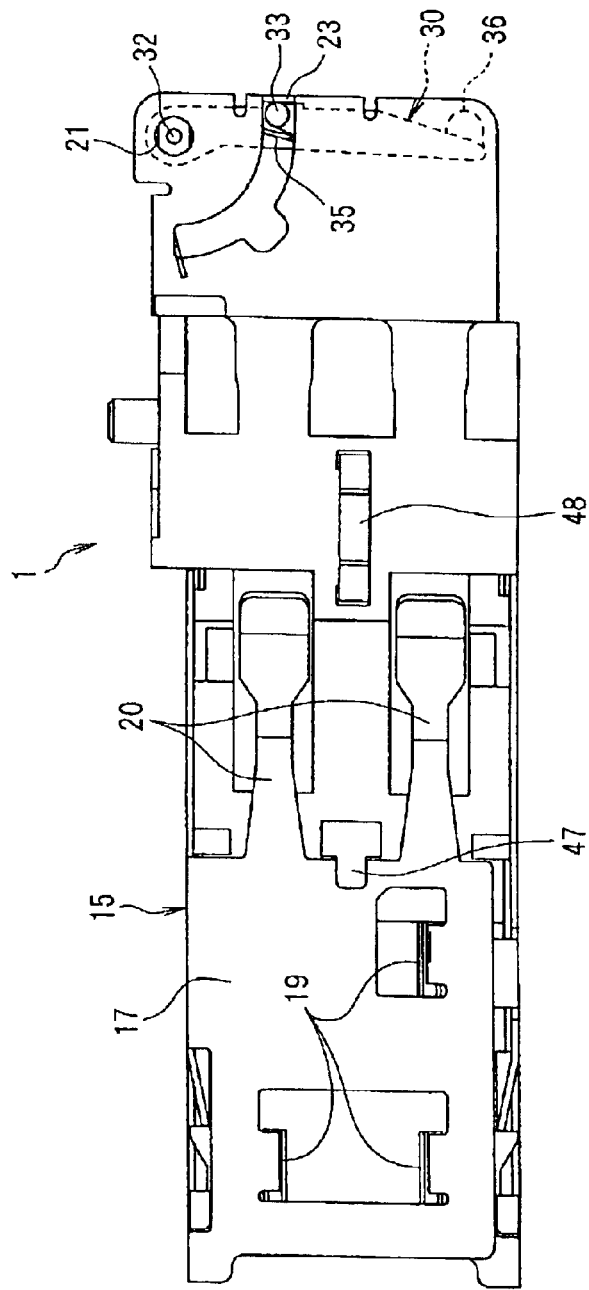
FIG. 11 is a left-side view of the metal frame portion at the card insertion end of a second embodiment of the card connector assembly of the present invention.
Figure 12:
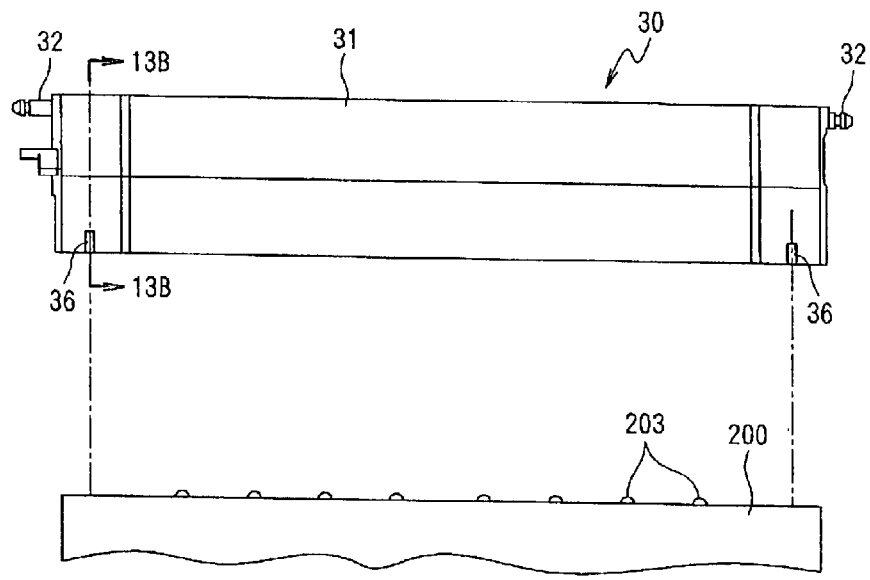
FIG. 12 is a front view showing the positional relationship between the projections formed on the surface of the PC card and the anti-dust shutter used in the second embodiment of the card connector assembly of the present invention.
Figure 13A:
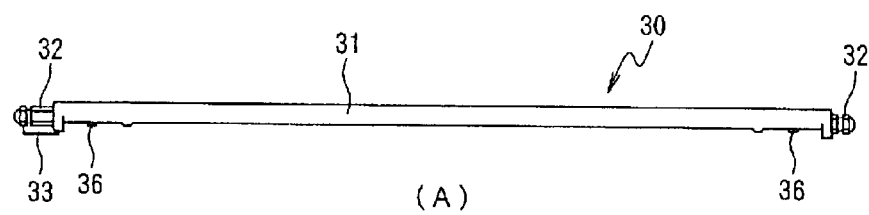
FIG. 13(A) is a plan view.
Figure 13B:
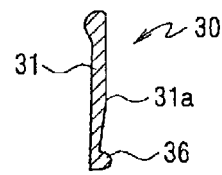
FIG. 13(B) is a sectional view along line 13B—13B in FIG. 12.
Figure 13C:
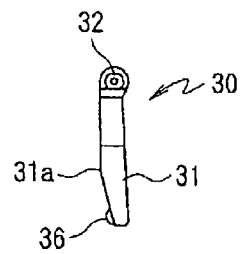
FIG. 13(C) is a right-side view.

The operation of the anti-dust shutter 30 shown in FIGS. 11 through 14 will now be described in greater detail. When the PC card 200 constituting the first card and the PC card 200 constituting the second card are inserted into the slot 10 (see FIG. 1) in a state in which the anti-dust shutter 30 is closed, as shown in FIG. 11, the anti-dust shutter 30 is pushed by the inserted PC cards 200 so that the anti-dust shutter 30 pivots from the state in which the stopper 33 is in contact with the stopper wall 23, and retracts into the interior of the slot 10. When the inserted PC cards 200 are pushed in further, the PC cards 200 are received in and connected to the connector 40 (see FIG. 1), so that the PC cards 200 are connected to the circuit board A. At this time, the projections 203 formed on the ground plates 202 of the inserted PC cards 200 contact the elastic tongue parts 44 of the ground plate 43, so that the PC cards 200 are grounded. The side surfaces of the metal plate parts 201 of the PC cards 200 contact the elastic tongue parts 20 of the frame 15, so that the PC cards 200 are also grounded.

Figure 14:
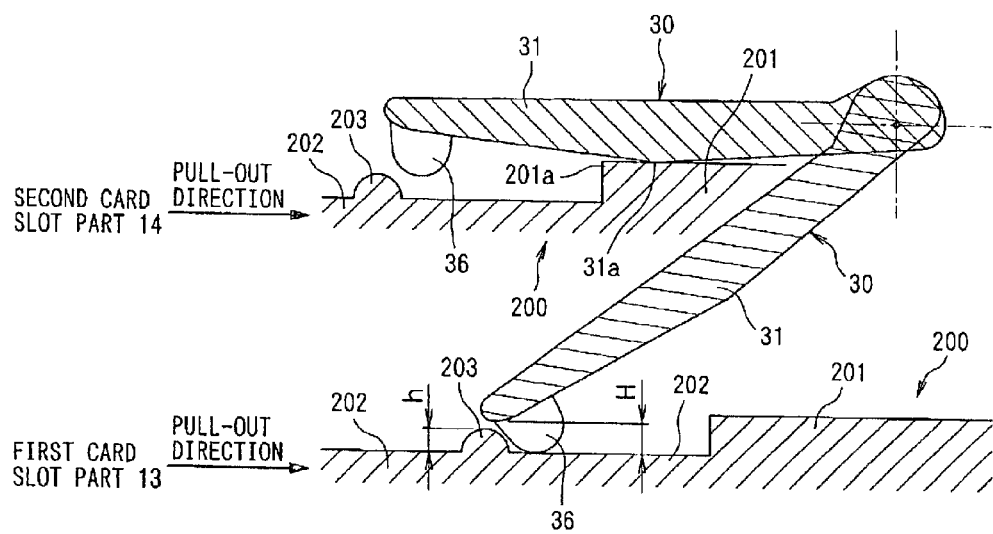
FIG. 14 is an explanatory diagram that illustrates the relationship between the projections formed on the surface of the PC card and the free end of the anti-dust shutter when the PC card is pulled out.
Figure 15:
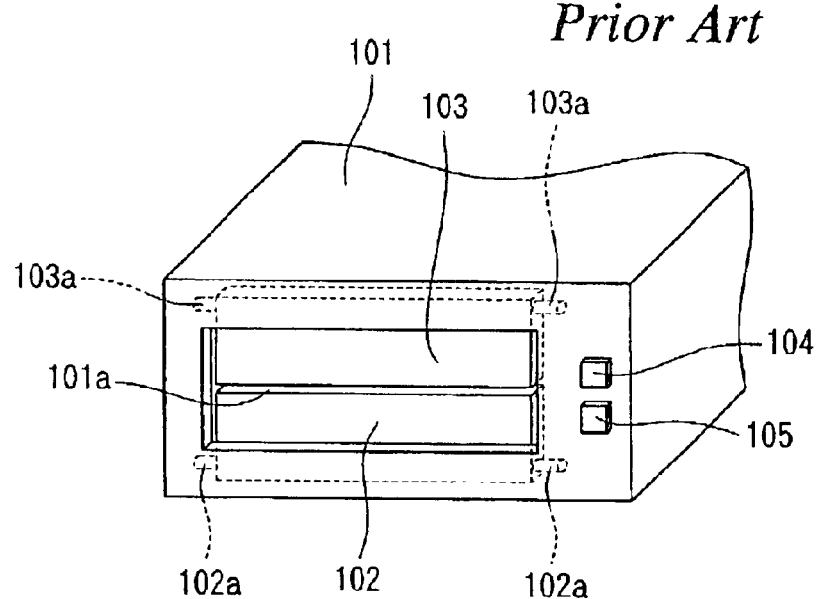
FIG. 15 shows a double slot anti-dust shutter mechanism of the prior art.
Figure 15:
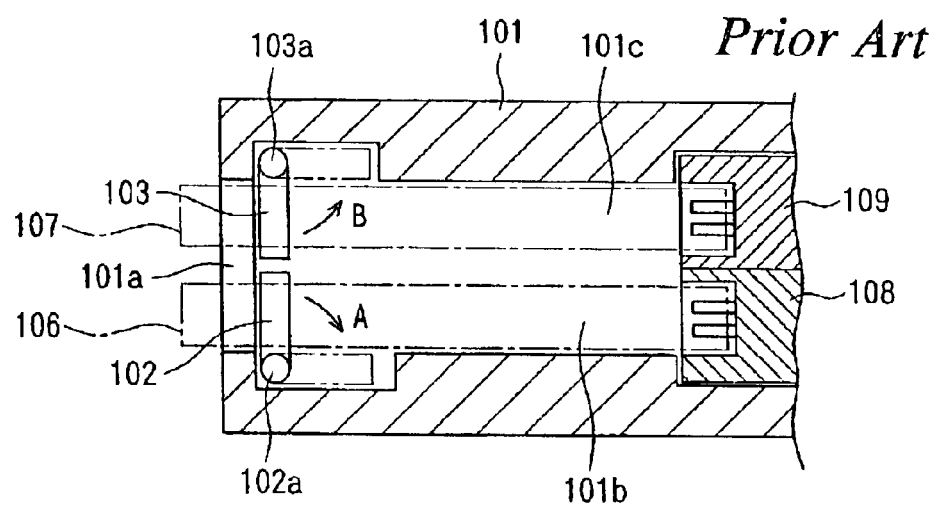

As shown in FIG. 14, when the PC card 200 inserted into the first card slot portion 13 is withdrawn from the first card slot portion 13, the engaging projections 36 engage with the surface of the PC card 200 and constitute an interference avoiding means that makes it possible to avoid interference between the projections 203 formed on the surface of the ground plate 202 and the anti-dust shutter 30. When the PC card 200 constituting the first card is withdrawn from the first card slot portion 13 (see FIG. 6) of the slot 10, the engaging projections 36 formed on the free end of the anti-dust shutter 30 slide over the surface of the metal plate part 201 of the PC card 200, and further slide over the surface of the ground plate 202 of the PC card 200 as shown in FIG. 14. When the withdrawal of the PC card 200 is completed, the anti-dust shutter 30 pivots to the outside of the first card slot portion 13 until the stopper 33 contacts the stopper wall 23. As a result, the anti-dust shutter 30 closes and substantially covers the space between the pair of side plate parts 17, 18 (see FIG. 2), so that the entry of dirt into the slot 10 and connector 40 is prevented. When the PC card 200 is withdrawn, contact of the projections 203 with the anti-dust shutter 30 is avoided as a result of the action of the engaging projections 36 formed on the free end of the anti-dust shutter 30, so that damage to the anti-dust shutter 30 caused by contact of the projections 203 with the anti-dust shutter 30 can be avoided. In the anti-dust shutter 30 shown in FIGS. 11 through 14, there is no need to form a cut-out 34 in the free end (unlike the case of the anti-dust shutter 30 shown in FIGS. 7 through 10). Accordingly, there is little deterioration in the anti-dust performance compared to the anti-dust shutter 30 shown in FIGS. 7 through 10.

Furthermore, when the PC card 200 constituting the second card is to be pulled out of the second card slot portion 14 (see FIG. 6) of the slot 10, the apex 31a formed on the undersurface of the flat-plate part 31 of the anti-dust shutter 30 slides over the surface of the metal plate part 201 which rises higher than the projections 203 from the ground plate 202 in the PC card 200 (as shown in FIG. 14). The corner part 201a of the metal plate part 201 moves while contacting the undersurface of the flat-plate part 31 of the anti-dust shutter 30. Accordingly, the projections 203 do not contact the anti-dust shutter 30. When the withdrawal of the PC card 200 is completed, the anti-dust shutter 30 pivots to the outside of the second card slot portion 14 until the stopper 33 contacts the stopper wall 23. As a result, the anti-dust shutter 30 closes and substantially covers the space between the pair of side plate parts 17, 18, so that the entry of dirt into the slot 10 and connector 40 is prevented.

In the card connector assembly of the present invention, the anti-dust shutter comprises interference avoiding means which make it possible to avoid interference between projections formed on the surfaces of the cards and the anti-dust shutter when the cards are pulled out of the slot. Accordingly, interference of the projections with the anti-dust shutter can be avoided so that damage to the anti-dust shutter caused by interference of the projections can be avoided. The interference avoiding means may consist of a cut-out that is formed in the free end of the anti-dust shutter in a position that faces the projections or may consist of engaging projections which are formed so that the engaging projections protrude from the free end of the anti-dust shutter in positions that do not face the projections formed on the surfaces of the cards and which can engage with the surfaces of the cards. Especially in cases where the interference avoiding means is formed by engaging projections, there is no need to form a cut-out in the free end of the anti-dust shutter. Accordingly, the deterioration in the anti-dust performance can be reduced compared to a case in which the interference avoiding means is formed by a cut-out.

Embodiments of the present invention have been described herein. The present invention, however, is not limited to the aforementioned embodiments. Many other embodiments are possible within the scope and spirit of the invention. For example, the slots that receive PC cards 200 or the like may consist of a single slot, or three or more slots. The aforementioned embodiments are therefore regarded as illustrative and not limiting.

What is claimed is:

1. A card connector assembly comprising:
   a slot for inserting a personal computer card, the card having raised portions;
   a connector for receiving the card that is inserted into the slot; and
   an anti-dust shutter that pivots into an interior of the slot when the card is inserted and has a cut-out that enables the card to be withdrawn from the slot without interference from the raised portions on the card, the cut-out is formed on a free end of the anti-dust shutter and has a depth between a point where the free end of the anti-dust shutter engages a surface of the card having the raised portions to a point of intersection of the cut-out with an undersurface of the anti-dust shutter that is greater than a height of the raised portions.

2. The card connector of claim 1, wherein the cut-out is formed in a position corresponding to the raised portions.

3. The card connector of claim 1, wherein the anti-dust shutter has an apex that contacts a surface of the card when the card is withdrawn from the slot.

4. The card connector of claim 1, wherein the cut-out has a depth greater than 0.5 mm.

5. The card connector of claim 1, wherein the slot has a first slot portion and a second slot portion formed in a plurality of tiers.

6. The card connector of claim 1, wherein the anti-dust shutter is formed by molding an insulating resin.

7. A card connector assembly comprising:
   a slot for inserting a personal computer card, the card having raised portions;
   a connector for receiving the card that is inserted into the slot; and
   an anti-dust shutter that pivots into an interior of the slot when the card is inserted and has a projection that enables the card to be withdrawn from the slot without interference from the raised portions on the card, the projection is formed on a free end of the anti-dust shutter, the projection has a height from a point of engagement of the projection with a surface of the card having the raised portions to a point of attachment of the projection with the anti-dust shutter that is greater than a height of the raised portions.

8. The card connector of claim 7, wherein the projection is formed in a position away from the raised portions.

9. The card connector of claim 7, wherein the anti-dust shutter has an apex that contacts a surface of the card when the card is withdrawn from the slot.

10. The card connector of claim 7, wherein the projection has a height greater than 0.5 mm.

11. The card connector of claim 7, wherein the slot has a first slot portion and a second slot portion formed in a plurality of tiers.

12. The card connector of claim 7, wherein the anti-dust shutter is formed by molding an insulating resin.

13. The card connector of claim 7, wherein the projection engages a surface of the card when the card is withdrawn from the slot.

* * * * *